Figure 1:
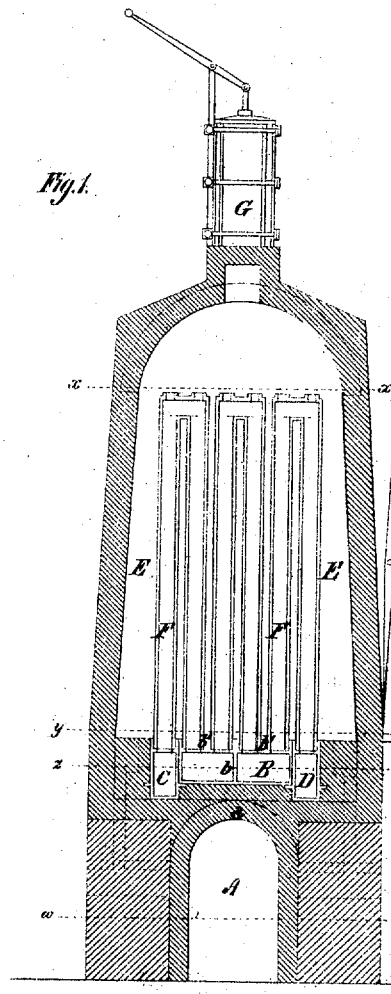

3. Sheets. Sheet. 1.

J. Player,

Hot Blast Oven.

No. 4,150. Reissued Oct. 11. 1870

James Henderson
Jasper Maidment Lawford } Assignees
Augusta Amelia Player
Henry McAllister Jr } Admrs of John Player deceased.

by their attorney
Henry Baldwin Jr

Witnesses.
J. Snowden Bell
Wm. B. Dayton

J. Player, 3. Sheets. Sheet. 2.
Hot Blast Oven.
No. 4150. Reissued Oct. 11. 1870
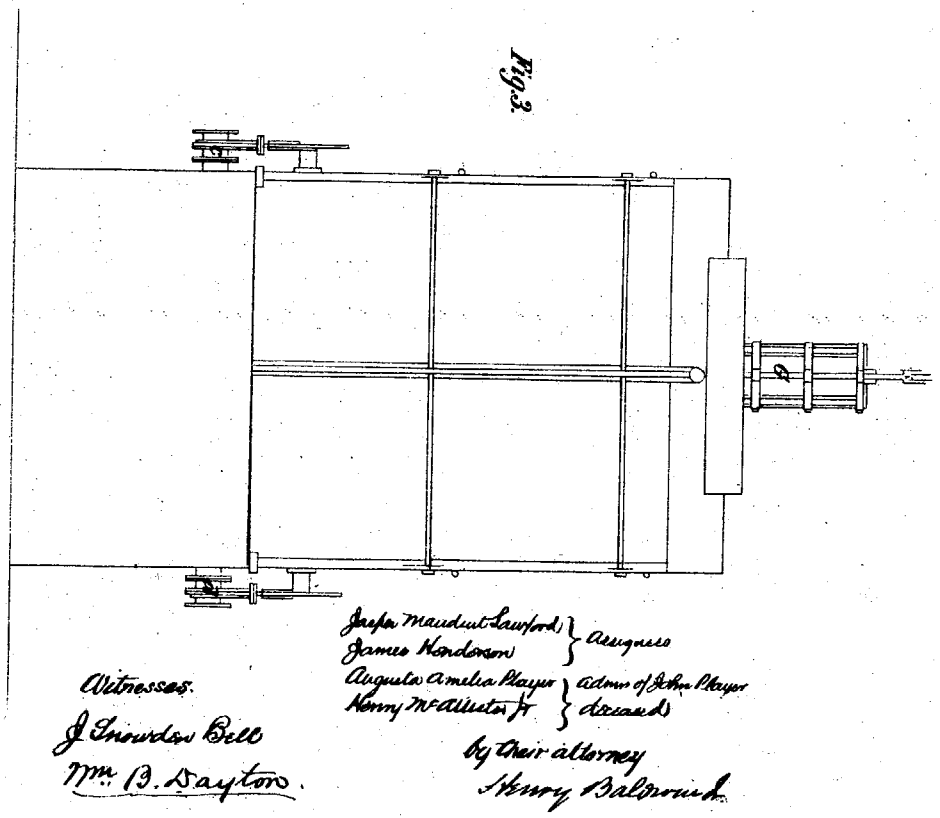
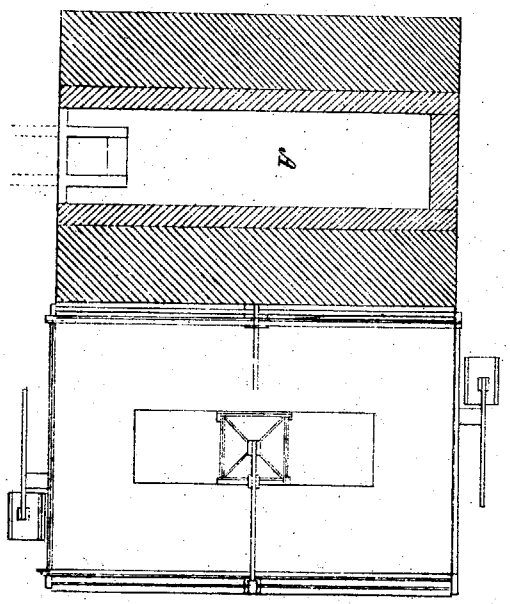

J. Player, 3. Sheets. Sheet. 3.
Hot Blast Oven.
No. 4,150. Reissued Oct. 11. 1870.
Fig. 6.
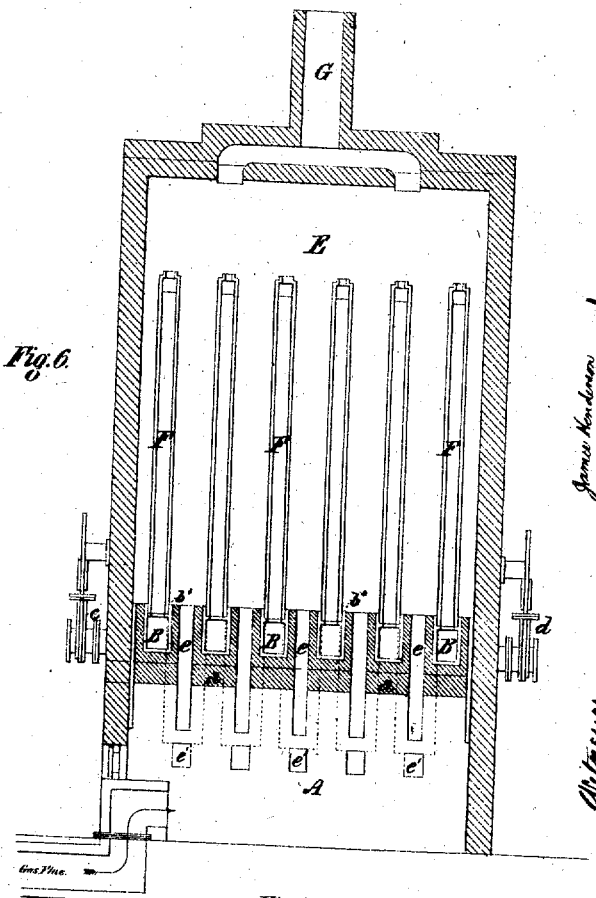
James Kerr Lewis
Justin Maurice Lacoste
Augusta Amelia Player
Henry Wm. Wallace Jr.
Assignees of Wm. Player deceased.
By their attorney
Henry Baldwin Jr.
Witnesses
Richard Rodd.
Wm. B. Sayles
Fig. 7.
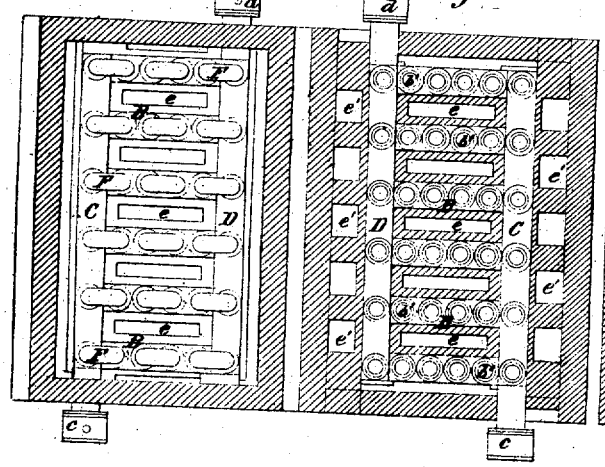
Fig. 8.
Fig. 9.
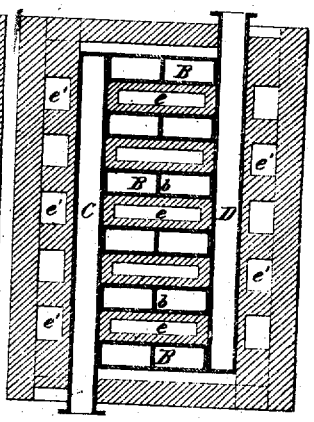

United States Patent Office.

JAMES HENDERSON, OF NEW YORK, N. Y., AND JASPER M. LAWFORD, OF PHILADELPHIA, PENNSYLVANIA, ASSIGNEES OF JOHN PLAYER, DECEASED.

Letters Patent No. 65,600, dated June 11, 1867; patented in England, March 25, 1865; reissue No. 4,150, dated October 11, 1870.

IMPROVEMENT IN APPARATUS FOR HEATING THE BLAST FOR FURNACES USED IN SMELTING IRON, &c.

The Schedule referred to in these Letters Patent and making part of the same.

*To all whom it may concern:*

Be it known that JOHN PLAYER, deceased, formerly of Norton, near Stockton-on-Tees, in the county of Durham, in England, and a subject of the Queen of Great Britain, late residing in the city and county of Philadelphia, in the State of Pennsylvania, in his lifetime invented an Improvement in Furnaces or Apparatus for Heating the Blast for Furnaces Used in Smelting Iron and for other Furnaces, of which improvement the following is a specification.

Before the said PLAYERS' invention of this improvement, the waste gases of blast-furnaces had been utilized for heating the blast, but owing to the character of the apparatus employed, the gases being ignited or becoming inflamed in the pipe-chamber, and the flames being allowed to play directly and freely upon and among the heating-pipes or the passages in which the blast is heated, the heating of these pipes or passages, and of the blast itself, had been very irregular and unequal, the pipes being, moreover, rapidly destroyed by this direct action of the flames.

The invention herein claimed consists in an improved blast-heating apparatus, in the operation of which the waste gases are conducted from a furnace directly to, and are ignited and consumed in, a combustion-chamber, separate from, but communicating with the pipe-chamber, or the chamber in which the blast-heating pipes or passages are arranged, which last-mentioned chamber is by preference situated above the combustion-chamber, and the heated vapor or fume thus generated by the combustion of the gases in the combustion-chamber passes, through numerous narrow openings in its top, into the pipe-chamber, where, without any indication of flame, and without the irregular, unequal, injurious action of flame, it surrounds the blast-heating pipes with an equable atmosphere of very high temperature, and thus necessarily acts equably, not only upon all of the pipes, but upon each part of each pipe immersed in this glowing atmosphere.

The chamber in which the blast-heating pipes or passages are arranged is of such relatively large dimensions as to leave ample spaces between and around the pipes, in which spaces the vapor and fume from the combustion-chamber, without being or becoming inflamed, maintain the highly-heated atmosphere in continual action upon the blast-heating pipes, as above described, and thereby sustain the blast at a more constant and more uniformly high temperature than before said PLAYERS' invention had been attained in using waste gases for this purpose, at the same time relieving the pipes from the rapidly-deleterious action of flame.

The accompanying drawing, which is on a scale of one-fourth of an inch to the foot, shows a double air-heating stove, illustrating said invention, but the two stoves being symmetrical, and each letter of reference indicating, wherever used, the same part in either of them, the description is given as of one only.

Each of these stoves is of dimensions and capacity suitable for heating to a temperature of about 1,200° Fahrenheit about two thousand three hundred cubic feet of air per minute, at a pressure of two and a half pounds per square inch. The dimensions and arrangements shown in the drawing are of said PLAYERS' approved construction, but may be varied in the details without departing from his invention.

Figure 2:
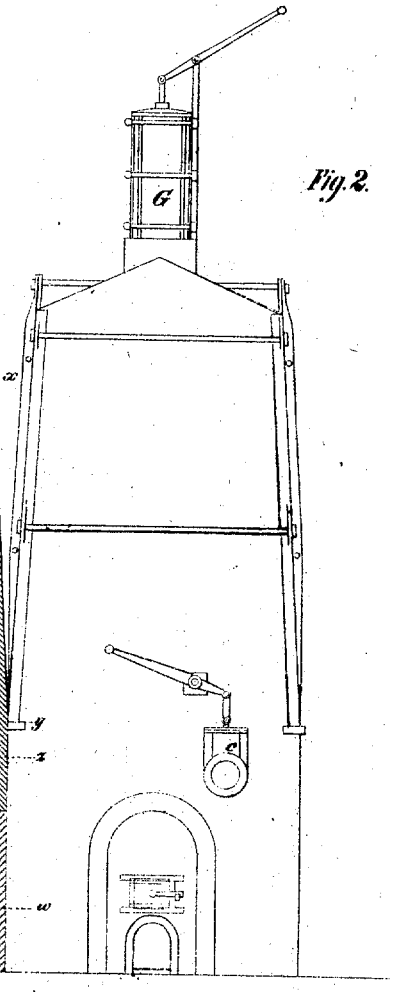

Figure 1 is a cross-section through the stove;
Figure 2, an end elevation;
Figure 3, a side elevation;
Figure 4, a plan or top view;
Figure 5, a horizontal longitudinal section through the stove at the line *w w* of fig. 1;
Figure 6, a vertical longitudinal central section;
Figure 7, a horizontal section at the line *x x* of fig. 1;
Figure 8, a similar section at the line *y y* of fig. 1, with the pipes removed; and
Figure 9, a similar section at the line *z z* of fig. 1.

The drawing indicates a gas-flue leading directly from the furnace to the combustion-chamber.

A is the combustion-chamber, having an arched top, *a*, through which narrow openings *e* extend from the combustion-chamber to the pipe-chamber.

Above this arch, and on each side of the narrow openings *e*, are arranged short troughs B, one for each row of pipes, (in this instance six in number,) of rectangular section, and closed at each end. Each of these troughs extends horizontally across the stove, between the two blast-flues hereinafter described, and is divided by a central partition, *b*, and has a top provided with sockets *b'*, to receive the ends of the blast-heating pipes.

The blast-flue C, by which the air to be heated is led to the pipes, is also of rectangular section, closed at one end, and provided at the other end, which projects outside of the stove, with a regulating-valve, *c*.

A similar flue, D, also having a valve, *d*, on its projecting end, conducts the blast away from the stove, after it has been heated.

The top of each of these flues is flush with the tops of the troughs B, and is, like them, provided with corresponding sockets to receive the ends of the blast-heating pipes.

These flues C D are respectively arranged horizontally and longitudinally in the stove, above the level of the top of the combustion-chamber, one at each side of the stove, so as respectively to extend across either end of the troughs B and openings *e*, figs. 1, 7, 8, and 9.

Above these troughs and blast-flues is the pipe-chamber E, which has a valved chimney, G, of the usual construction.

In addition to the numerous narrow openings *e* in the arched top of the combustion-chamber, between the troughs or rows of pipes, there are also, in this instance, openings $e'$ from the combustion-chamber up through the foundation into the pipe-chamber at each side of the stove, between the shell and the blast-flues, which openings $e'$, although wide at the top, are narrow for the main part of their length or depth, so that these openings, being numerous, afford ample and free passage for the vapor and fume from the combustion-chamber to the pipe-chamber, but, being at the same time narrow and deep, they tend to smother the flames leaping up into them from the combustion-chamber, and exclude them from the pipe-chamber, thus preventing the vapor or fume in the pipe-chamber from becoming inflamed.

The blast-heating pipes F are made by preference of an inverted U-shape, as shown in the drawing. At the top of each limb of the pipes is an an opening, to facilitate the removal of the cores from the pipes after they are cast. These openings are closed by stoppers when the stove is at work. This construction of the blast-heating pipes with a rectangular or box top is practically valuable to the founder, as it enables him to cast the pipe vertically, in the same manner as water-pipes are cast, and thus secures a uniform thickness of metal, and consequently increased durability. The end of the core-barrel projects through the opening in the top of the pipe. It is found, moreover, that this rectangular shape given to the tops of these pipes increases the action of the heat upon the blast passing through them, and diminishes the injurious action of the external heat in the chamber E upon the top of the pipe, as a larger surface is thus subjected to this action, and the blast is acted upon through a correspondingly-enlarged area.

The lower ends of the pipes are secured, so as to make air-tight joints, in the sockets provided for them in the blast-flues and in the troughs, and so that the pipes on one side of the stove straddle the blast-flue C and the troughs B; the middle row straddles across the partitions $b$ in the troughs B, and the row on the other side of the stove straddles the troughs B and the blast-flue D, so that the air to be heated enters the blast-flue C at one side of the stove, ascends one limb of each of the six pipes into which it opens, descends into the six troughs B, ascends and descends the next six pipes, straddling the troughs B, and then ascends one limb of the next six pipes, and descends into the exit blast-flue D, having become highly heated in its transit across the stove.

It is to be observed that there should be no access of atmospheric air to the pipe-chamber E, the only inlet to which is through the numerous narrow openings between it and the combustion-chamber, as the only outlet from it is through the valved-chimney, and thus, while the vapor or fume in the pipe-chamber is glowing or red hot, it does not become inflamed.

The operation of the stove is as follows:

The waste gases are received in the combustion-chamber A, where they are ignited and consumed, and generate an intense heat; but the interposition of the arched top between the two chambers, or the removal of the pipes so far from the combustion-chamber, the numerous but deep and narrow openings or communications between the two chambers, and the exclusion of atmospheric air from the pipe-chamber, prevent the flames of the ignited gases in the combustion-chamber from reaching or extending to the pipe-chamber, so as to injure the pipes, or to inflame the vapor or fume in the pipe-chamber while the vapor or fume fills the pipe-chamber with a glowing atmosphere, without any indication of flame, as already set forth.

The admission of the blast, its traverse through the pipes, and its exit from the stove, having been already described, need not be repeated.

What is claimed as the invention of the said JOHN PLAYER is—

The combination, in a hot-blast stove, of a combustion-chamber in which the waste gases from a furnace are received, ignited, and consumed, substantially as described; a separate blast-heating chamber, from which flame is excluded substantially as described, and communicating with the combustion-chamber only through numerous narrow openings; and conduits for the blast within the heating-chamber, but removed from the action of the flame or ignited gases, substantially as and for the purposes described.

JAMES HENDERSON.
J. M. LAWFORD.
AUGUSTA A. PLAYER.
HENRY McALLISTER, JR.

Witnesses as to HENDERSON and LAWFORD:
S. H. DAVIS,
GEO. H. BARR.

Witnesses as to A. A. PLAYER:
JNO. McKIM,
T. N. SANFORD.

Witnesses as to HENRY McALLISTER, JR.
S. M. KRAUSER,
CHAS. M. ROWLEY.